US006427518B1

United States Patent
Miekley et al.

(10) Patent No.: US 6,427,518 B1
(45) Date of Patent: *Aug. 6, 2002

(54) APPARATUS FOR ASCERTAINING A ROTATION RATE AND FOR PERFORMING A SELF-TEST

(75) Inventors: Klaus Miekley, Ludwigsburg; Manfred Abendroth, Marbach, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,510

(22) PCT Filed: Jul. 8, 1999

(86) PCT No.: PCT/DE99/02116

§ 371 (c)(1),
(2), (4) Date: Mar. 29, 2000

(87) PCT Pub. No.: WO00/08416

PCT Pub. Date: Feb. 17, 2000

(30) Foreign Application Priority Data

Aug. 6, 1998 (DE) .......................... 198 35 578

(51) Int. Cl.$^7$ .......................... G01D 21/00; G01C 19/00
(52) U.S. Cl. .................. 73/1.37; 73/1.38; 73/504.13; 73/504.12; 73/504.14; 73/504.15; 73/504.16
(58) Field of Search .................. 324/160, 73.1, 324/727; 73/1.37, 1.75, 504.13, 1.38, 504.01, 504.12, 504.14, 504.15, 504.16, 504.17; 396/259, 463; 228/102

(56) References Cited

U.S. PATENT DOCUMENTS

| | | | | |
|---|---|---|---|---|
| 3,573,374 A | * | 4/1971 | Focht et al. ................ 704/268 |
| 3,805,588 A | * | 4/1974 | Stone .......................... 73/1.78 |
| 3,877,314 A | * | 4/1975 | Bernin ........................ 73/1.38 |
| 4,101,910 A | * | 7/1978 | Mayer ........................ 396/259 |
| 5,004,985 A | * | 4/1991 | Holroyd et al. .............. 324/727 |
| 5,203,821 A | * | 4/1993 | Tanaka ........................ 73/1.38 |
| 5,230,458 A | * | 7/1993 | Asanasavest ................ 228/102 |
| 5,355,730 A | * | 10/1994 | Koizumi ....................... 73/497 |
| 5,383,362 A | * | 1/1995 | Putty et al. ............... 73/504.01 |
| 5,426,970 A | * | 6/1995 | Florida et al. ................ 73/1.37 |
| 5,450,751 A | * | 9/1995 | Putty et al. ............... 73/504.18 |
| 5,616,864 A | * | 4/1997 | Johnson et al. .......... 73/504.13 |
| 5,652,374 A | * | 7/1997 | Chia et al. .................... 73/1.38 |
| 5,889,193 A | * | 3/1999 | Pfaff et al. .................... 73/1.37 |

FOREIGN PATENT DOCUMENTS

DE 44 47 005 A 7/1996

OTHER PUBLICATIONS

Sparks et al. "A CMOS Integrated Surface Micromachined Angular Rate Sensor" IEEE 1997 pp. 851–854.*

* cited by examiner

Primary Examiner—N. Le
Assistant Examiner—Wasseem H. Hamdan
(74) Attorney, Agent, or Firm—Michael J. Striker

(57) ABSTRACT

An apparatus for determining a rotation rate has an oscillatory body 11 on which a plurality of electromechanical converters A, A', B, B', C, C', D, D' are mounted. At least a first converter A, A' is caused to oscillate mechanically by an electric driver signal $U_{F,O}$ generated in a first circuit arrangement 12. Further, at least a second converter D, D' is caused to oscillate mechanically by an electric damping signal $U_{F,D}$ generated in a second circuit arrangement 13. At least a third converter C, C' emits an electric sensor damping signal $U_{S,D}$ which corresponds to the oscillation of the body 11 in the location where the at least third converter D, D' is mounted. The damping sensor signal $U_{S,D}$ is fed back to the input of the second circuit arrangement 13. A voltage divider 31 is provided, by means of which the signal $U_{F,D}$ generated in the second circuit arrangement 13 can be reduced.

4 Claims, 2 Drawing Sheets

APPARATUS FOR ASCERTAINING A ROTATION RATE AND FOR PERFORMING A SELF-TEST

BACKGROUND OF THE INVENTION

The invention is directed to an apparatus for determining a rotation rate, with an oscillatory body on which a plurality of electromechanical converters are mounted, of which at least a first converter is caused to oscillate mechanically by an electric driver signal generated in a first circuit arrangement, and at least a second converter is caused to oscillate mechanically by an electric damping signal generated in a second circuit arrangement, and at least a third converter emits an electric sensor damping signal which corresponds to the oscillation of the body in the location where the at least third converter is mounted ,the sensor damping signal being fed back to the input of the second circuit arrangement.

This type of apparatus which generally works according to the principle of a vibration gyrometer is known, for example, from DE-44 47 005 A1. The electromechanical converters present in the apparatus, generally piezo-electric elements, evaluate the effect of the Coriolis acceleration which serves as a measure for a rotation rate at which the oscillatory body rotates. This known apparatus is therefore well suited for use in connection with systems for controlling driving dynamics in motor vehicles, since the detected Coriolis acceleration can be used as a measure for the current yaw rate of the vehicle.

In the case of the known apparatus, the oscillatory body is realized as a thin-walled hollow cylinder made from an elastic material. On the cylinder wall, eight piezo-elements are arranged at a uniform distance of 45 degrees relative to one another. The piezo-elements arranged, for example, at the positions of 0 degrees, 90 degrees, 180 degrees and 270 degrees work together with an oscillator stage. The piezo-elements arranged in the positions of 45 degrees, 135 degrees, 225 degrees and 315 degrees work together with a damping stage. The piezo-elements arranged in the positions of 0 and 180 degrees are caused to oscillate mechanically by an oscillator driver stage. The piezo-elements arranged in the positions at 90 and 270 degrees emit a signal which corresponds to the oscillation of the hollow cylinder in the location where the piezo-elements are arranged. The signal emitted by the piezo-elements arranged in the 90-degree and 270-degree positions is fed back to the input of the circuit arrangement for generating the electric oscillator driver signal in such a way that this results in an oscillator oscillating at its resonant frequency.

The hollow cylinder is oscillated by the piezo-electric elements which are arranged at the positions of 0 and 180 degrees and which are mechanically oscillated by the oscillator driver stage. The hollow cylinder oscillates in such a way that nodal points form at the positions of 45 degrees, 135 degrees, 225 degrees and 315 degrees when it is in a steady state. If a rotation rate acts on the hollow cylinder from outside, the steady state of the hollow cylinder is disturbed because of the Coriolis acceleration. The system is detuned in such a way that the position of the nodal points shifts. Because of this, the hollow cylinder carries out oscillations in the locations where the nodes were previously.

The piezo-elements arranged in the 45-degree and 225-degree positions can be oscillated mechanically using a damping driver stage. The piezo-elements arranged in the positions of 135 degrees and 315 degrees emit a signal which corresponds to the oscillation of the hollow cylinder at the location where they are arranged. The signal emitted by the piezo-elements arranged in the positions of 135 and 315 degrees is fed back to the input of the circuit arrangement which is provided for the excitation of the piezo-elements arranged in the positions of 45 degrees and 225 degrees in such a way that the oscillations in the positions of 135 degrees and 315 degrees are compensated approximately to zero.

The voltage fed back to the input of the circuit arrangement for the excitation of the piezo-elements arranged in the positions of 45 degrees and 225 degrees is a measure of the detuning of the hollow cylinder caused by the effect of a rotation rate on the oscillating hollow cylinder. This signal can therefore be used as a measure of the rotation rate.

For adaptation to a circuit arrangement for further processing of the signal, the known apparatus provides an amplifier with adjustable amplification. Although the output signal of the known apparatus can be adjusted by the amplifier, the known apparatus has the disadvantage that it does not provide for the possibility of tuning or balancing the circuit with respect to the tolerances of the component parts. This has disadvantageous results especially when, as provided in the known circuit arrangement, the possibility is provided for adding an interference signal by means of which the perfect functioning of the circuit arrangement is tested in a so-called self-test.

In order to carry out the self-test, the signal which is emitted by the piezo-elements arranged in the positions of 90 degrees and 270 degrees and which is fed back to the input of the oscillator driver stage is guided to an amplifier and guided via a switch to the input of the damping driver stage provided for the excitation of the piezo-elements arranged in the positions of 45 degrees and 225 degrees. This detunes the system in the same manner as is effected under the effect of a rotation rate. Since the magnitude of the self-test signal is determined, the output signal must reach a certain magnitude because of the detuning if the apparatus is working correctly. If this is not the case, it indicates that the apparatus is not working properly.

Since the output signal which is generated because of the interference signal is supposed to correspond to a predetermined rotation rate and be independent of the adaptation carried out by the output amplifier, the amplifier for generating the self-test signal can also be adjusted with respect to its amplification. The independence of the output signal from the adaptation effected by the output amplifier is achieved in that the inputs of the amplifier for adjusting the amplification are coupled together and work in opposite directions.

Tolerances of component parts cannot be compensated for, however, by adapting the self-test signal by means of the amplifier which is adjustable with respect to amplification. In particular, differences between the dynamic systems behavior or transient response of the piezo-elements of the damping stage and the piezo-elements of the oscillator stage cannot be compensated for by adjusting the self-test signal.

However, as regards the self-test, a perfect functioning of the known circuit arrangement is only guaranteed if the transient responses are identical so that they cancel each other. Since this is not the case in practice, an incorrect self-test value is obtained. A correspondingly large expenditure on circuitry is required in order to overcome this problem. Adapting the transient response to an integrated circuit, the known circuit arrangement generally being constructed as such, is overridden by the process parameters of semiconductor production and is therefore difficult to do with the desired accuracy. In the case of the known circuit arrangement, a systematic correction is therefore effected by two capacitive voltage dividers of different values in the hybrid circuit following the circuit arrangement. However, this is disadvantageous because this step has a temperature response made up of the transient response and the capacitive voltage divider.

SUMMARY OF THE INVENTION

It is the object of the present invention to construct an apparatus of the type mentioned in the beginning in such a way that it can be tuned in a simple manner.

This object and others which will be made more apparent hereinafter are attained in an apparatus for determining a rotation rate, with an oscillatory body on which a plurality of electromechanical converters are mounted, of which at least a first converter is caused to oscillate mechanically by an electric driver signal generated in a first circuit arrangement, and at least a second converter is caused to oscillate mechanically by an electric damping signal generated in a second circuit arrangement, and at least a third converter emits an electric sensor damping signal which corresponds to the oscillation of the body in the location where the at least third converter is mounted, the sensor damping signal being fed back to the input of the second circuit arrangement.

According to the invention, there is provided a voltage divider by means of which the signal generated in the second circuit arrangement can be reduced. It has been shown that the transient response of the piezo-elements of the damping stage is always stronger than that of the piezo-elements of the oscillator stage. The signal for generating the self-test signal which has been decoupled from the oscillator stage must therefore be compensated for by a typically weaker output signal from the damping driver stage. The output signal of the circuit arrangement obtained because of the self-test signal therefore always deviates from the true value by being lower.

If the signal to the piezo-elements of the damping stage in the positions of 45 degrees and 225 degrees is reduced, the circuit arrangement for generating the signal required for the excitation of the piezo-elements arranged in the positions of 45 degrees and 225 degrees must supply an output voltage that is higher than it would have to be if the signal had not been reduced. Accordingly, the output signal of the circuit arrangement according to the invention is increased so that its value corresponds to the self-test signal that is fed in.

Accordingly, it is possible to adapt the output signal of the apparatus for determining a rotation rate to the self-test signal by changing the signal provided for the excitation of the damping stage. It is particularly advantageous that the adaptation can be done using a resistive voltage divider. This has a very positive effect on the temperature response of the apparatus. Further, it is very advantageous that the voltage divider is in the low-impedance driver circuit and not in the high-impedance sensor circuit. Since the adaptation is carried out by the entire circuit arrangement, all of the tolerances affecting the self-test signal can be compensated for in this way. In a particularly advantageous manner, the voltage division is carried out using a potentiometer.

In a special embodiment form of the invention, circuit elements are provided by means of which an interference signal is guided to the input of the second circuit arrangement. By mean of this interference signal, a self-test of the apparatus according to the invention can be carried out in an advantageous manner. It is particularly advantageous in the circuit according to the invention that the output signal generated because of the interference signal can be adjusted easily using the voltage divider.

In another embodiment form of the apparatus according to the invention, at least a fourth electromechanical converter is provided which emits a sensor driver signal corresponding to the oscillation of the body at the location where the at least fourth converter is arranged, in which case the sensor driver signal is guided back to the input of the first circuit arrangement and the interference signal corresponds to a part or a multiple of the sensor driver signal that is guided back to the input of the first circuit arrangement. Since the interference signal is obtained from the oscillator circuit, its frequency corresponds at all times exactly to the frequency at which the oscillatory body is oscillating. It can therefore be adapted optimally to the input of the second circuit arrangement.

BRIEF DESCRIPTION OF THE DRAWING

Further advantages of the present invention are indicated in the subsequent description of a particular embodiment example with reference to the drawing.

DETAILED DESCRIPTION OF THE INVENTION

Figure 1:
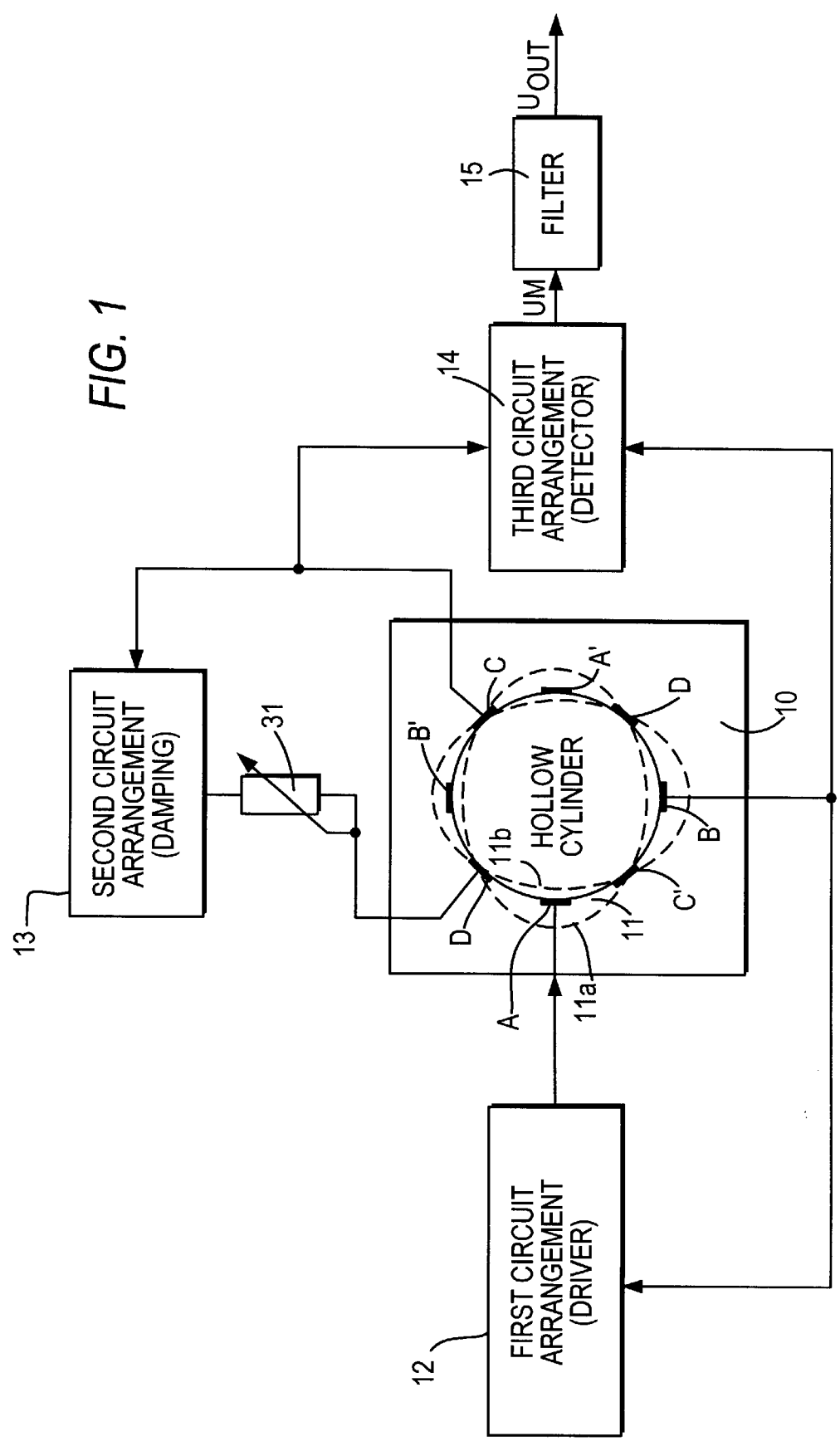
FIG. 1 shows a block diagram of an apparatus according to the invention.

In FIG. 1, the sensor is designated by 10. The hollow cylinder 11 of the sensor 10 carries the individual measuring elements A, A', B, B', C, C' and D, D'. The deformations that the hollow cylinder 11 can assume because of oscillations are shown in dashes.

The piezo-elements A, B, C, D are connected to the blocks 12, 13, 14 of the electronics; the oscillator loop (drive circuit) which causes a constant mechanical drive oscillation of the piezo-element in question is designated by 12. A damping circuit is designated by 13, and reference number 14 designates the detector circuit at whose output the measuring signal $U_M$ originates, this measuring signal $U_M$ then being filtered suitably in the filter 15 so that the actual output signal $U_{out}$ is obtained. The signal output by the damping circuit 13 is divided down by means of a potentiometer 31. The piezo-elements A', B', C', D' are internally connected with elements A, B, C, D.

By means of the sensor arrangement shown in FIG. 1, including the electronics of a rotation rate sensor working on the principle of a vibration gyrometer, the yaw speed, or yaw rate, of a vehicle can be determined. In this connection, the Coriolis effect together with a rotation speed which is coupled in vertical to the drive oscillation causes a Coriolis acceleration resulting in a deflection of the drive oscillation in the Coriolis direction. This deflection is ultimately a measure of the coupled in rotation rate and is to be measured.

Figure 2:
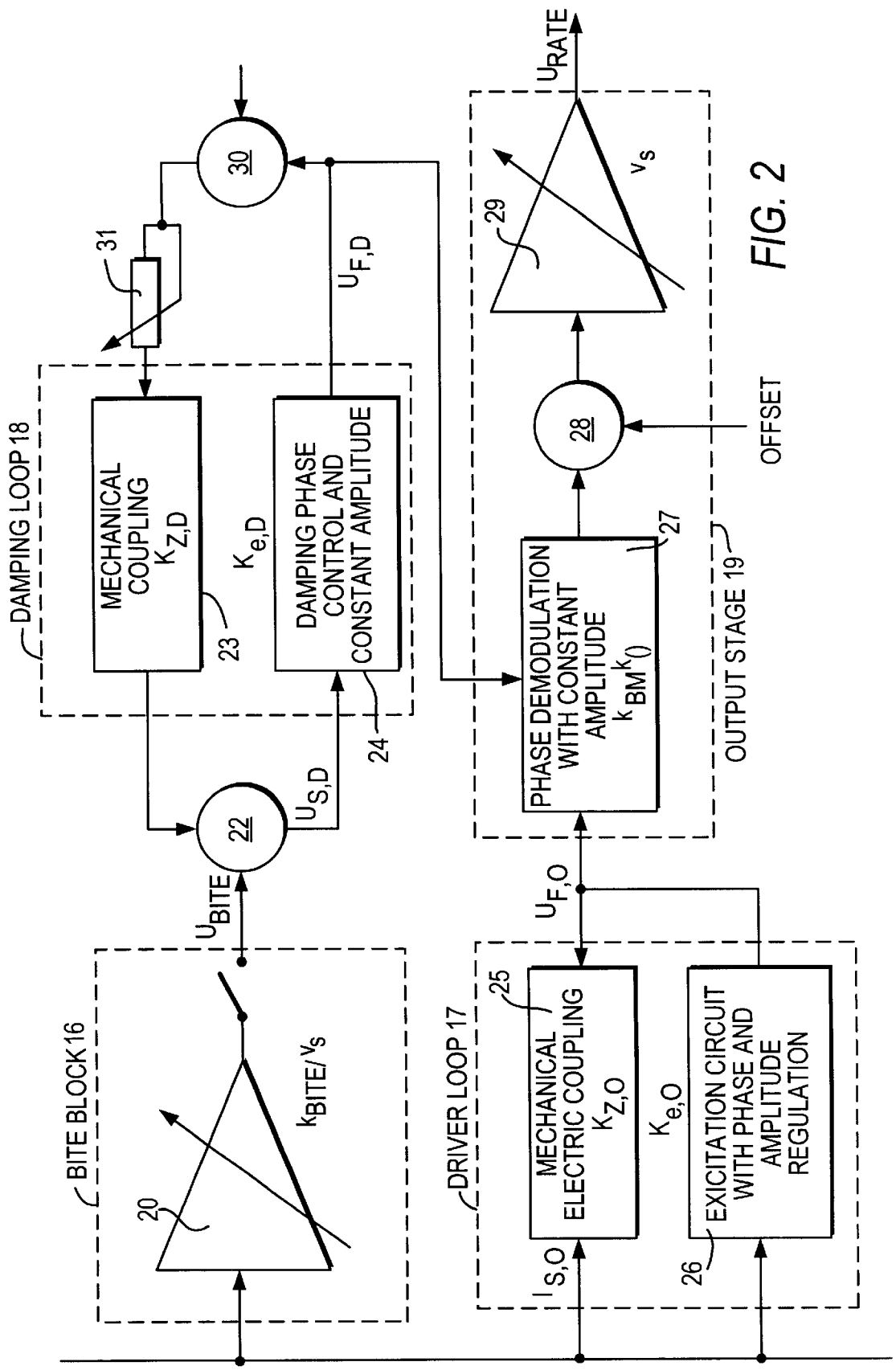
FIG. 2 shows the arrangement from FIG. 1 in a structured block diagram.

FIG. 2 shows the evaluation circuit of an apparatus according to the invention. In this arrangement, the sensor and the associated electronics are coupled with one another. The shown arrangement essentially comprises four blocks. The first block 16 is the so-called BITE-block; the oscillator loop is designated by 17, the damping loop is designated by 18 and the output stage is designated by 19.

The blocks 16 to 19 contained in FIG. 2 are divided into further blocks. The interactions between the individual blocks are characterized by corresponding connecting lines, indicating, as the case may be, the direction of effect by corresponding arrows. In particular, the BITE-block 16 comprises an amplifier 20 with variable amplification in which the BITE-function is generated. This function is symbolized by the expression $k_{BITE}/v_S$. It is conveyed to point 22 via the BITE-switch 21 in the form of the BITE-interference variable $U_{BITE}$ when a test BITE-test is initiated at point 22.

This point 22 is connected with the blocks 23, 24 of the damping loop 18. The block 23 refers to the mechanical coupling (of the cylinder and the measuring elements, that is, for example, of the piezo-elements). The transfer function of the sensor element is designated as $k_{Z,D}$.

The block 24 shows an electronic damping loop with phase control from the AFC and constant amplification. The associated transfer function of the electronic damping loop is designated as $k_{e,D}$. Moreover, the electric zero point adjustment takes place at point 22. The voltage at point 22 is designated as $U_{S,D}$.

Two blocks 25, 26 of the oscillator loop 17 which interact with each other are shown. Block 25 in turn refers to the mechanical coupling between the cylinder and piezo-elements. The transfer function of the sensor element is $k_{Z,O}$. The voltage is designated by $U_{S,O}$. This is the voltage of the oscillator loop, i.e., the voltage of the system excitation.

Block 26 refers to the electronic excitation loop with the phase regulator (AFC) and amplitude regulator (AGC). The associated transfer function of the oscillator loop is designated by $k_{e,O}$.

The drive or force voltage $U_{F,O}$ is applied to the connecting point between blocks 25 and 26 and is guided to block 27 for phase demodulation and for constant amplification of the output stage 19. Further, block 27 receives the voltage $U_{F,D}$ from the damping loop 18. The transfer function of block 27 is referred to as $k_{BM} * k_O$. At the output of block 27, a point 28 is indicated where the offset compensation is carried out. An amplifier 29 with variable amplification is connected to point 28; the amplification is designated by $v_S$. The output voltage for the rotation rate $U_{rate}$ can be tapped from the output of the amplifier 29 and is a measure of the rotation rate actually present.

The mechanical zero point adjustment is effected at point 30. For this zero point adjustment, a voltage $U_{cor}$ is fed in as the electrical equivalent of the Coriolis effect.

The voltage guided to block 23 for exciting the piezo-elements is divided down using a potentiometer 31. Since blocks 23 and 24 form a control circuit, block 24 must therefore give out a greater output voltage $U_{S,D}$ than it would have to if the signal had not been divided down. Therefore, the greater transfer function $k_{Z,D}$ of block 23 can be compensated by the potentiometer 31.

The arrangement indicated in FIG. 2 as a block diagram can be used for evaluating the rotation rate sensor and, at the same time, for realizing a checking of the regular operability of the sensor and evaluating circuit itself.

When a suitable sensor element is set in constant mechanical drive oscillations by the amplitude controlled oscillator loop, the Coriolis effect together with a rotational oscillation which is coupled in vertical to the drive oscillation causes a deflection of the drive oscillation in the Coriolis direction. The hollow cylinder on which the piezo-elements used as measuring elements are arranged is oscillated more because of these effects. The hollow cylinder therefore wavers between the limits indicated by dashes in FIG. 1.

If a compensation loop, for example, a servo loop, is used for evaluating the deflection, which, as has already been mentioned, is a measure of the rotation rate that has been coupled in, the resulting manipulated variable is a measure of the rotation rate to be measured. When this compensation loop is detuned with an offset signal that is coupled in in proper phase relation, the output of the sensor will show the superimposition of rotation rate and offset. This offset is generated in the BITE-block. Applying the offset can be carried out, for example, by operating the BITE-switch 21; the sensor becomes testable for a known detuning. Since the test function affects the evaluating electronics as well as the sensor element through the loop arrangement, both can be tested for malfunctions.

The derivation of the voltage $U_{rate}$ resulting at the output of the sensor when the BITE-function is activated corresponds to the derivation described in DE-44 47 005 A1. DE-44 47 005 A1 is therefore explicitly referred to and is included in its entirety into the present invention.

The assumption made in DE-44 47 005 A1 that the transfer function $k_{Z,D}$ is as big as the transfer function $k_{Z,O}$ of block 25 is realized in the present invention by reducing the voltage supplied to block 23 by means of the potentiometer 31. The prerequisite for the derivation carried out in DE 44 47 005 A1 is therefore provided by the potentiometer.

What is claimed is:

1. An apparatus for measuring a rotation rate, said apparatus comprising an oscillatory hollow body (11) having an outer surface and made of elastic material;

a plurality of electromechanical transducers (A, A'; B, B'; C,C'; D, D') arranged spaced apart from each other on said outer surface of said oscillatory hollow body;

driver circuit means (12, 26) for exciting mechanical oscillations of at least a first (A, A') of said electromechanical transducers by means of an electrical driver signal ($U_{F,O}$) generated in said driver circuit means;

damping circuit means (13, 24) for exciting mechanical oscillations of at least a second (D, D') of said electromechanical transducers by means of an electrical damping signal ($U_{F,D}$) generated in said damping circuit means;

output circuit means (14, 19) for generating an output voltage that depends on the rotation rate, said output circuit means communicating with at least a third (C, C') of said electromechanical transducers, said at least a third of said electromechanical transducers emitting a damping oscillatory sensor signal ($U_{S,D}$) corresponding to an oscillation of said hollow body at a location where said at least a third electromechanical transducer is located, wherein said damping oscillatory sensor signal ($U_{S,D}$) is fed back to an input of said damping circuit means; and adjusting circuit means for adjusting said electrical damping signal ($U_{F,D}$) fed to said at least a second (D,D') of said electromechanical transducers;

wherein said adjusting circuit means comprises a continuously adjustable potentiometer (31) connected between an output of said damping circuit means (13, 24) and said at least a second (D, D') of said electromechanical transducers and wherein said continuously adjustable potentiometer (31) includes a variable resistor;

whereby differences between transient response of said transducers in said damping and driver circuit means during self-testing and measurement operation modes may compensated.

2. The apparatus as defined in claim 1, wherein said hollow body is a hollow cylinder and said plurality of said electromechanical transducers consist of eight of said transducers arranged with equal angular spacing around said outer surface of said hollow cylinder.

3. The apparatus as defined in claim 1, further comprising circuit means (16) for supplying an interference signal ($U_{BITE}$) to said damping circuit means (13, 24).

4. The apparatus as defined in claim 3, further comprising at least a fourth (B, B') of said electromechanical transducers for emitting a sensor driver signal ($U_{S,O}$) corresponding to an oscillation of said hollow body at a location where said at least a fourth (B, B') of said electromechanical transducers is located, wherein said sensor driver signal ($U_{S,O}$) is fed back to said driver circuit means (12, 26) and said interference signal ($U_{BITE}$) corresponds to a part or a multiple of said sensor driver signal ($U_{S,O}$).

* * * * *